(12) United States Patent
Anderson (10) Patent No.: US 8,306,170 B2
(45) Date of Patent: Nov. 6, 2012

(54) DIGITAL AUDIO/VIDEO CLOCK RECOVERY ALGORITHM

(75) Inventor: Richard Eugene Anderson, Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 2930 days.

(21) Appl. No.: 09/052,673

(22) Filed: Mar. 31, 1998

(65) Prior Publication Data

US 2003/0206605 A1 Nov. 6, 2003

(51) Int. Cl.
*H04L 7/00* (2006.01)
(52) U.S. Cl. .................................. 375/355; 375/376
(58) Field of Classification Search .................. 375/376, 375/240.28, 226, 354, 371, 355, E7.278, 375/364; 348/512; 370/516, 503, 375.62; 327/141
See application file for complete search history.

(56) References Cited

U.S. PATENT DOCUMENTS

| | | | | |
|---|---|---|---|---|
| 5,287,182 A * | 2/1994 | Haskell et al. | ................. | 348/500 |
| 5,473,385 A * | 12/1995 | Leske | ..................... | 375/240.26 |
| 5,594,660 A * | 1/1997 | Sung et al. | ..................... | 715/203 |
| 5,699,392 A * | 12/1997 | Dokic | ........................... | 375/376 |
| 5,768,326 A * | 6/1998 | Koshiro et al. | ................ | 375/376 |
| 5,784,119 A * | 7/1998 | Noda et al. | ...................... | 348/512 |
| 5,790,543 A * | 8/1998 | Cloutier | ......................... | 370/252 |
| 5,828,416 A * | 10/1998 | Ryan | .............................. | 348/512 |
| 5,862,450 A * | 1/1999 | Mandal et al. | ................... | 725/91 |
| 5,881,114 A * | 3/1999 | Moon | ............................. | 375/376 |
| 5,917,873 A * | 6/1999 | Shiomoto et al. | ............. | 375/376 |
| 6,028,648 A * | 2/2000 | Yu | .................................... | 8/845.3 |
| 6,356,567 B2 * | 3/2002 | Anderson et al. | ............. | 370/516 |
| 6,429,902 B1 * | 8/2002 | Har-Chen et al. | ............. | 348/518 |
| 6,496,553 B1 * | 12/2002 | Rokugo | ......................... | 375/376 |
| 2003/0086518 A1 * | 5/2003 | Chakravarthy | ................ | 375/359 |

OTHER PUBLICATIONS

"MPEG-2: A Tutorial Introduction to the Systems Layer" Sarginson, P.A. MPEG-2—What it is and What it isn't, IEE Colloquium on, 1995, pp. 401-413.*
David L. Mills, "RFC 1305 Network Time Protocol (Version 3)", Mar. 1992.*

* cited by examiner

*Primary Examiner* — Aristocratis Fotakis
(74) *Attorney, Agent, or Firm* — Scully, Scott, Murphy & Presser, P.C.; Anthony Canale (57) ABSTRACT

A method of decoding a bit stream having an embedded clock, where the clock reference data is recovered from the bit stream. The clock reference data is used to create an adjusting value to control a local clock frequency. The adjustment is calculated such that the local clock frequency and the local clock value match the frequency and values in the clock reference data. The adjustment value is input to pulse generator to form a pulse train, which is used to generate the input to an adjustable oscillator.

13 Claims, 9 Drawing Sheets

DIGITAL AUDIO/VIDEO CLOCK RECOVERY ALGORITHM

FIELD OF THE INVENTION

This invention relates to digital delivery systems, especially for digital video and digital audio data. More particularly, the invention relates to multiplexors networks, distribution systems, demultiplexors, and multiplexed bitstreams, and especially to bitstreams carrying a system or transport layer, and one or more data layers of compressed digital video and digital audio data. More particularly, the invention relates to recovering the system clock with minimum demand on a processor.

BACKGROUND OF THE INVENTION

Within the past decade, the advent of world-wide electronic communications systems has enhanced the way in which people can send and receive information. Moreover, the capabilities of real-time video and audio systems require a large bandwidth. In order to provide services such as video-on-demand and video conferencing to subscribers, an enormous amount of network bandwidth is required. In fact, network bandwidth is often the main inhibitor to the effectiveness of such systems.

In order to minimize the effects of the constraints imposed by the limited bandwidths of telecommunications networks, compression systems and standards have evolved. These standards prescribe the compression of video and audio data and the delivery of several programs and control data in a single bit stream transmitted in a bandwidth that would heretofore only accommodate one analog program.

One video and audio compression standard is the Moving Picture Experts Group ("MPEG") standard. Within the <PEG-2 standard, video compression is defined both within a given picture, i.e., spatial compression, and between pictures, i.e., temporal compression. Video compression within a picture is accomplished by conversion of the digital image from the time domain to the frequency domain by a discrete cosine transform, quantization, variable length coding, and Huffman coding. Video compression between pictures is accomplished via a process referred to as motion compensation, in which a motion vector is used to described the translation of a set of picture elements (pels) from one picture to another. Audio compression is as defined in the standard.

The procedure for transporting the compressed bitstream from the transmitting end to the receiving end of the system, and for thereafter decompressing the bitstream at the receiving end, so that one of the many picture sequences is decompressed and may be displayed in real-time is specified in ISO 13818-1. ISO 13818-1 is the systems or transport layer portion of the MPEG-2 standard. This portion of the standard specifies packetization of audio and video elementary bitstreams into packetized elementary stream (PES), and the combination of one or more audio and video packetized elementary stream into a single time division or packet multiplexed bitstream for transmission and the subsequent demultiplexing of the single bitstream into multiple bitstreams for decompression and display. The single time division or packet multiplexed bit stream is as shown from various architectural and logical perspectives in the FIGURES, especially FIGS. 1 to 5, where many packets make up a single bitstream.

Figure 1:
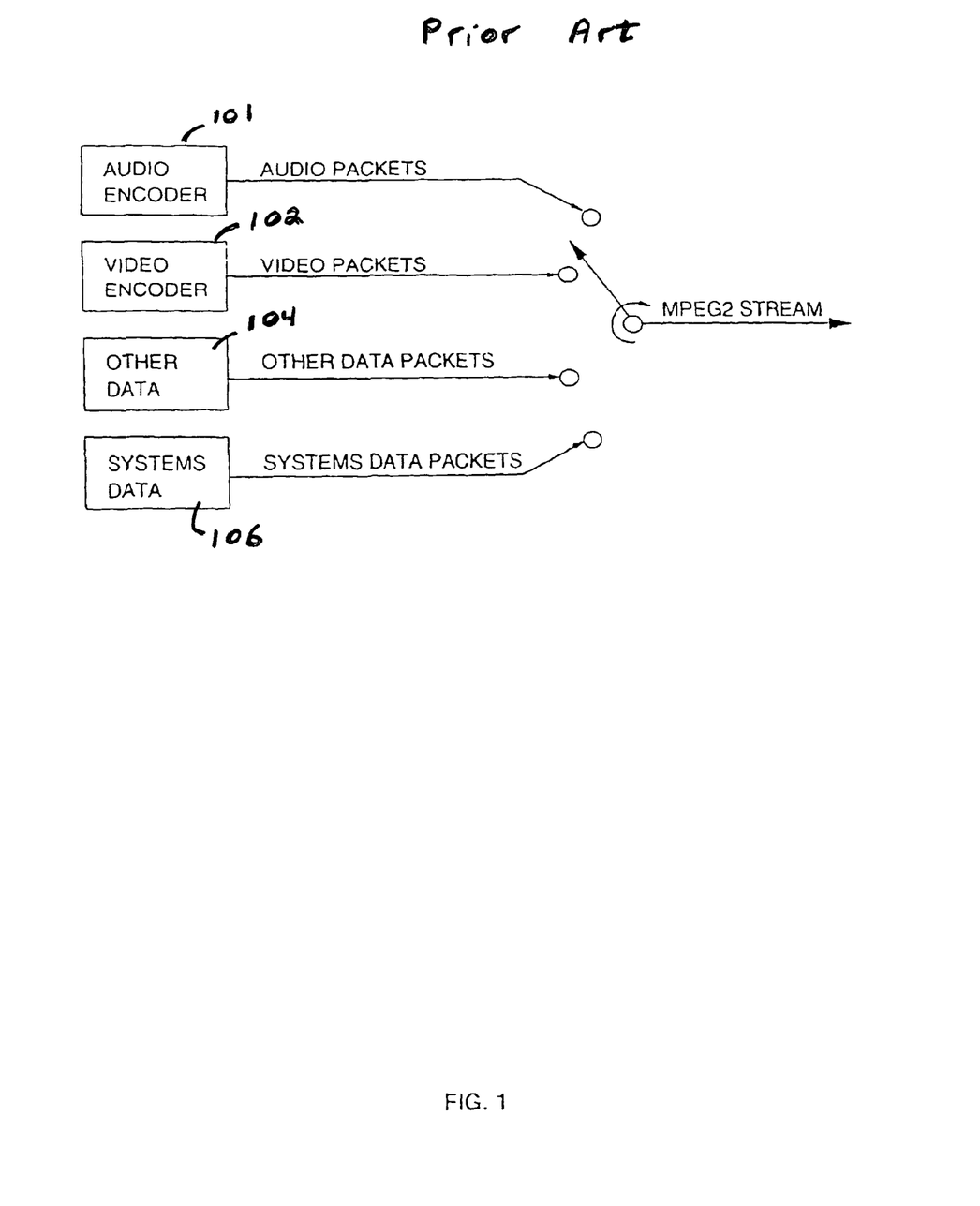
FIG. 1, denominated Prior Art, shows the packet multiplexing of the transport stream.

The concept of packetization and the mechanism of packet multiplexing are shown in FIG. 1, denominated "Prior Art", where elementary streams are formed in an audio encoder 101, a video encoder 102, a source 104 of other data, and a source 106 of systems data. These elementary streams are packetized into packetized elementary streams, as described hereinbelow. The packetized elementary streams of audio data, and video data, and the packets of other data and systems data are packet multiplexed by the multiplexor into a system stream.

Figure 2:
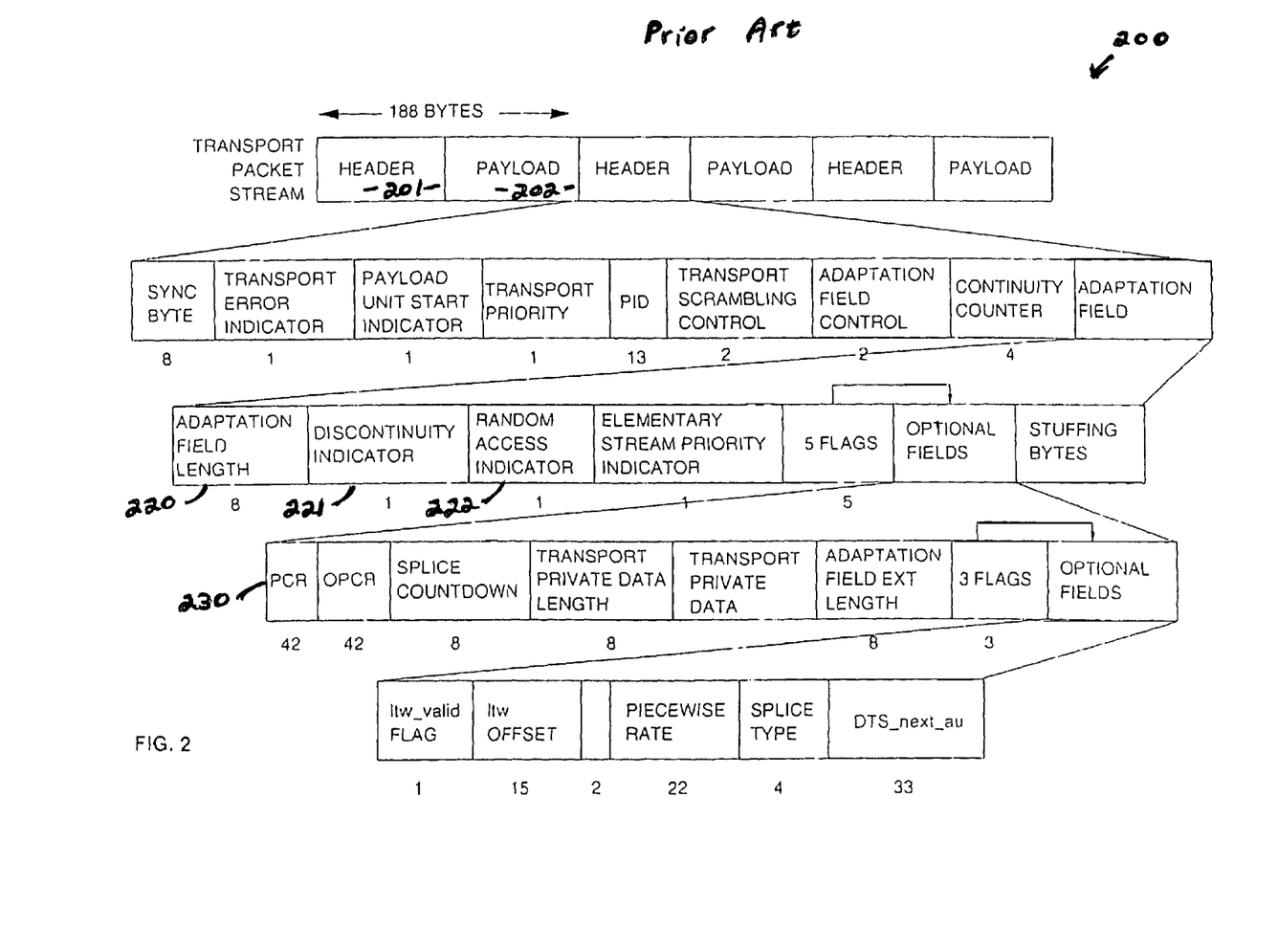
FIG. 2, denominated "Prior Art", shows a schematic view of the transport packet stream with a 188 byte packet, a 4 byte header, an optional adaptation field, and payload, the payload being present if the adaptation field is less then 184 bytes.
Figure 5:
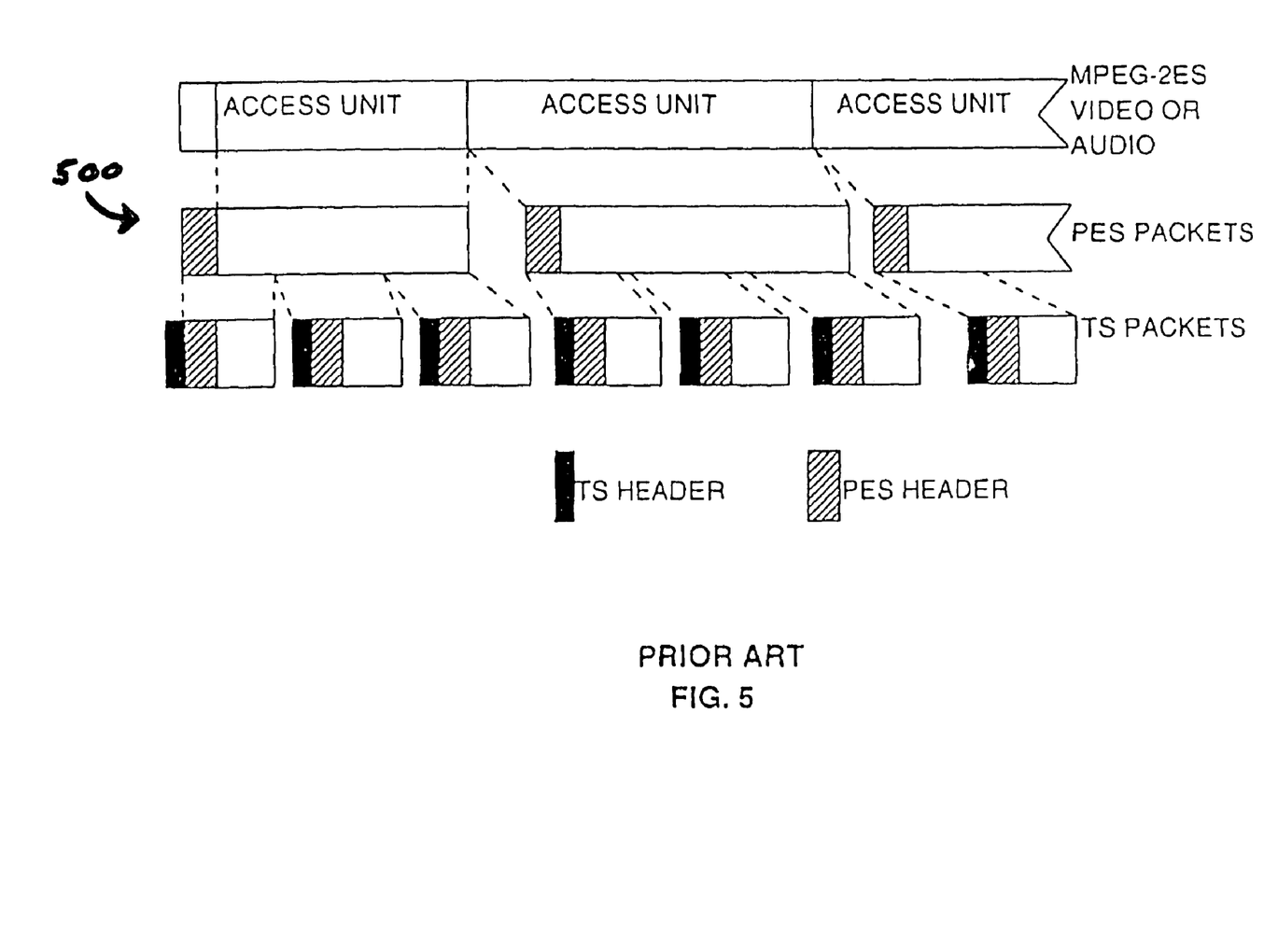
FIG. 5, denominated Prior Art shows the relationship of the layering of the access units, the PES packets, and the Transport Stream (TS) packets, with the encapsulation of elementary stream data into transport stream packets.

The time division or packet multiplexed bitstream is shown, for example, in FIGS. 2 and 5, both denominated "Prior Art", which gives an overview showing the time division or packet multiplexed bitstream. The bitstream is comprised of packets, as shown at 500 in FIG. 5. Each packet, as shown at 200 in FIG. 2, is, in turn, made up of a packet header 201, an optional adaptation field, and packet data bytes, i.e., payload 202.

The MPEG-2 System Layer has the basic task of facilitating and multiplexing of one or more programs made up of related audio and video bitstreams into a single bitstream for transmission through a transmission medium, and thereafter to facilitate the demultiplexing of the single bitstream into separate audio and video program bitstream for decompression while maintaining synchronization. By a "Program" is meant a set of audio and video bitstreams having a common time base and intended to be presented simultaneously. To accomplish this, the System Layer defines the data stream syntax that provides for timing control and the synchronization and interleaving of the video and audio bitstream. The system layer provides capability for (1) video and audio synchronization, (2) stream multiplex, (3) packet and stream identification, (4) error detection, (5) buffer management, (6) random access program insertion, (7) provide data, (8) conditional access, and (9) interoperability with other networks, such as those using asynchronous transfer mode (ATM).

Figure 3:
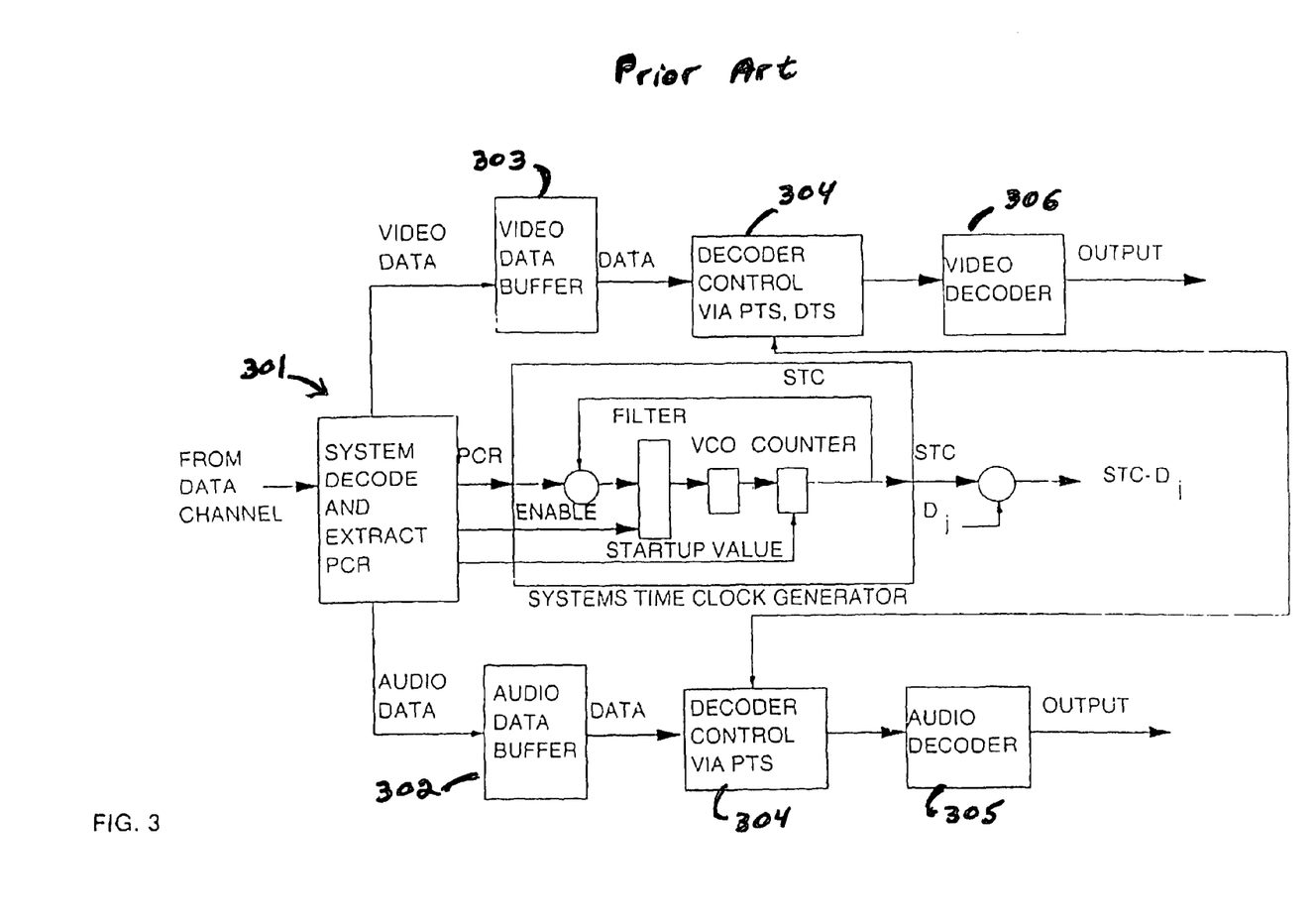
FIG. 3, denominated "Prior Art", is a schematic view of the MPEG-2 system structure, showing the system decoder, i.e., a demultiplexor, demultiplexing the incoming bitstream into an audio compression layer for an audio buffer and decoder, a video compression layer for a video buffer and decoder, and PCR data for clock control.

An MPEG-2 bitstream is made up of a system layer and compression layers. Under the MPEG-2 Standard (ISO/IEC 13818-1) a time division of packet multiplexed bit-stream consists of two layers, (1) a compression layer, also referred to as an inner layer, a payload layer, or a data layer, and (2) a system layer, also referred to as an outer layer or a control layer. The compression layer or inner layer contains the data fed to the video and audio decoders, and defines the coded video and audio data stream, while the system layer or outer layer provides the controls for demultiplexing the interleaved compression layers, and in doing so defines the functions necessary for combining the compressed data streams. This is shown in FIG. 3, denominated "Prior Art". As there shown a bitstream of, for example, a system layer and compression layer, is the input to a system decoder 301. In the system decoder the system layer data is demultiplexed into the compressed audio layer, the compressed video layer, and control data. The control data is shown in FIG. 3, denominated Prior Art, as the PCR (Program Clock Recover) data, enable data, and start up values. The compressed data is sent to the respective audio and video data buffers 302 and 303, and through decoder control 304 to the respective audio and video decoders 305 and 306.

The system layer supports a plurality of basic functions, (1) time division or packet multiplexing and demultiplexing of the time division or packet multiplexed multiple bit-streams, (2) synchronous display of the multiple coded bit stream, (3) buffer management and control, and (4) time recovery and identification. The system layer also supports (5) random access, (6) program insertion, (7) conditional access, and (8) error tracking.

For MPEG-2, the standard specified two types of layer coding, a program stream (PS), for relatively lossless environments, such as CD-ROMs, DVDs, and other storage media, and transport stream (TS), for loss media, as cable television, satellite television, and the like. The transport stream (TS), shown in FIG. 2, denominated Prior Art, consists of a stream of transport stream packets, each of which consists of 188 bytes, divided into 4 bytes of packet header, an optional adaptation field, and up to 184 bytes of the associated packet data, that is, payload. The relationship of the layering of the access units, the PES packets, and the Transport Stream (TS) packets is shown in FIG. 5, denominated Prior Art.

The transport stream (TS) is used to combine programs made up of PES-coded data with one or more independent time bases into a single stream. Note that under the MPEG-2 standard an individual program may not have a unique time base, but that if it does, the time base is the same for all of the elements of the individual program.

The packetized elementary stream (PES) layer is an inner layer portion of the MPEG-2 time division or packet multiplexed stream upon which the transport of program streams are logically constructed. It provides stream specific operations, and supports the following functions: (1) a common base of conversion between program and transport streams, (2) time stamps for video and audio synchronization and associated timing, especially for associated audio and video packets making up a television channel, presentation or program, and having a common time base, (3) stream identification for stream multiplexing and demultiplexing, and (4) such services as scrambling, VCR functions, and private data.

As shown in FIG. 5, denominated Prior Art, video and audio elementary streams (ES) must be PES-packetized before inserting into a transport stream(TS). Elementary streams (ES) are continuous. PES packets containing an elementary stream (ES) are generally of fixed lengths. Typically, video PES packets are in the order of tens of thousands of bytes, and audio PES packets are on the order of thousands of bytes. However, video PES packets can also be specified as of undefined length.

Figure 4:
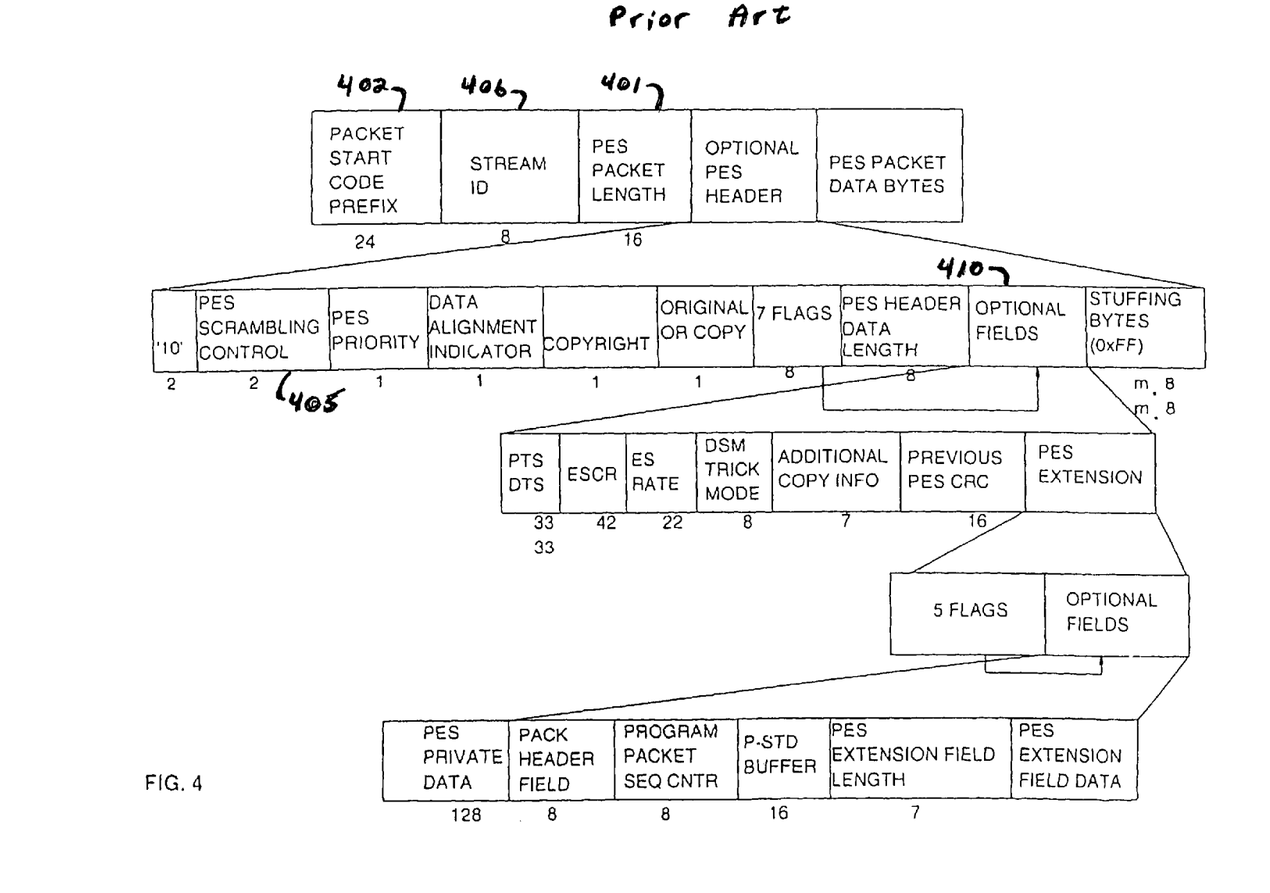
FIG. 4, denominated "Prior Art", is a schematic view of the PES (packetized elementary stream) structure according to the MPEG-2 Standard, showing the PES header. The FIGURE shows the PES header broken into its separate fields, with a further breakdown of the Extension field within the Optional Header field.

The MPEG-2 packetized elementary stream (PES) packet structure is shown in FIG. 4. To be noted is that all of the fields after the PES packet length 401 are optional. The PES (packetized elementary stream) packet has bit start code 402, a packet length field, a 2 bit "10" field, a scramble control field 405, a priority field, a data alignment field, a copy field, a PTS/DTS (Presentation Time Stamp/Decoding Time Stamp) field, a field for other flags, and a header length field.

The "Optional Header" field 410 includes a Presentation Time Stamp field, a Decoding Time Stamp field, an elementary stream clock reference field, a elementary stream rate field, a trick mode field, a copy info field, a Prior Packetized Elementary Stream Clock Recovery field, an extension and stuffing.

The packet start code provides packet synchronization. The stream ID field 406 provides packet identification. Payload identification is also provided by the stream ID. The PTS/DTS flag fields and the PTS/DTS fields provide presentation synchronization. Data transfer is provided through the packet/header length, payload, and stuffing fields. The scramble control field facilitates payload descrambling, the extension/private flag fields and the provide data fields provide private information transfer.

A transport stream (TS) may contain one or more independent, individual programs, such as individual television channels or television programs, where each individual program can have its own time base, and each stream making up an individual program has its own PID. Each separate individual program has one or more elementary streams (ES) generally having a common time base. To be noted, is that while not illustrated in the FIGURES, different transport streams can be combined into a single system transport stream. Elementary stream (ES) data, that is, access unit (AU), are first encapsulated into packetized elementary stream (PES) packets, which are, in turn, inserted into transfer stream (TS) packets, as shown in FIG. 5, denominated Prior Art.

The architecture of the transport stream (TS) packets under the MPEG-2 specifications is such that the following operations are enabled: (1) demultiplexing and retrieving elementary stream (ES) data from one program within the transport stream, (2) remultiplexing the transport stream with one or more programs into a transport stream (TS) with a single program, (3) extracting transport stream (TS) packets from different transport streams to produce another transport stream (TS) packet into one program and converting it into a program stream (PS) containing the same program, and (5) converting a program stream (PS) into a transport stream (TS) to carry it over a lossy medium to thereafter recover a valid program stream (PS).

At the transport layer, the transport sync byte provides packet synchronization. The Packet Identification (PID) field data provides packet identification, demultiplexing, and sequence integrity data. The PID field is used to collect the packets of a stream and reconstruct the stream. The continuity counters and error indicators provide packet sequence integrity and error detection. The Payload Unit start indicator and Adaption Control are used for payload synchronization, while the Discontinuity Indicator and Program Clock Reference (PCR) fields are used for playback synchronization. The transport scramble control field facilitates payload descrambling. Privite data transfer is accomplished through the Private Data Flag and Private Data Bytes. The Data Bytes are used for private payload data transfer, and the Stuffing Bytes are used to round out a packet.

Achieving and maintaining clock recovery and synchronization is a problem, especially with audio and video bitstreams. The MPEG-2 model assumes an end-to-end constant delay timing model in which all digital image and audio data take exactly the same amount of time to pass through the system from encoder to decoder. The system layer contains timing information that requires constant delay. The clock references are Program Clock Reference (PCR) and the time stamps are the Presentation Time Stamp/Decoding Time Stamp (PTS/DTS).

The decoder employs a local system clock having approximately the same 27 Megahertz frequency as the encoder. However, the decoder clock can not be allowed to free run. This is because it is highly unlikely that frequency of the decoder clock would be exactly the same as the frequency of the encoder clock.

Synchronization of the two clocks is accomplished by the Program Clock Reference (PCR) data field in the packet adaptation field of the PCR PID for the program. The Program Clock Reference values can be used to correct the decoder clock. Program Clock Reference, or PCR, is a 42 bit field. It is coded in two parts, a PCR Base having a 33-bit value in units of 90 kHz, and a PCR extension having a 9-bit extension in units of 27 MHz, where 27 MHz is the system clock frequency.

As a general rule, the first 42 bits of the first PCR received by the decoder initialize the counter in a clock generation, and subsequent PCR values are compared to clock values for fine adjustment. The difference between the PCR and the local clock can be used to drive a voltage controlled oscillator, or a similar device or function, for example, to speed up or slow down the local clock.

Audio and video synchronization is typically accomplished through the Presentation Time Stamp (PTS) inserted in the Packet Elementary Stream (PES) header. The Presentation Time Stamp is a 33-bit value in units of 90 kHz, where 90 kHz is the 27 MHZ system clock divide by 300. The PTS value indicates the time that the presentation unit should be presented to the user.

The system layer timing information, PCR and PTS/DTS, keep the encoder and decoder in synchronization, with the PCR values correcting the decoder clock. The timing information, PCR and PTS/DTS, arrive at the decoder about every 10-100 milliseconds for the PCR, and at least as frequently as about every 700 milliseconds for the PTS/DTS. Processing and filtering the timing signals consumes significant processor resources. This is because the clock signals are in mixed number bases, the clock signals can arrive at widely varying times, there is no way to sort out necessary interrupts from unnecessary interrupts, and, most important of all, errors in clock management are directly visible and/or audible through buffer overflow or underflow and color disturbance. However, as noted above, the relationship between PCR and the STC values are used to drive a voltage controlled oscillator or similar device. The voltage controlled oscillator or similar device speeds up or slows down the local clock driving the STC. In this context, a need exists for functionality in the system to reduce the processing demand on the processor. Specifically, there is a need for (1) reducing the number of clock management interrupts to the processor, and (2) a mechanism to closely match the rates of the encoder and decoder clocks as specified by the PCR and STC values as well as minimizing the difference between the PCR and STC values. The last requirements allows an internal clock recovery mechanism to make small adjustments to the value controlling the local clock frequency without interrupting the processor for a period of time.

OBJECTS OF THE INVENTION

It is a primary object of the invention to provide for clock recovery while reducing the processing demand on a processor.

It is a still further object of the invention to provide additional hardware or software functions that reduce the clock recovery load on the host.

It is a still further object of the invention to match the local clock frequency to the encoder frequency specified by the arriving time stamps very quickly.

It is still a further object of the invention to minimize the difference between the PCR and STC values.

It is a still further object of the invention to keep the clock recovery mechanism, self regulating when in a self-regulating condition, interrupting the host only during a significant clock change.

SUMMARY OF THE INVENTION

According to our invention clock recovery is obtained with minimum processing demand on the host or other processor. This is accomplished by a software mechanism running on a processor which closely matches the local clock frequency to that specified by the arriving time stamps (PCRs). The software mechanism also minimizes the difference between the PCR and STC values. The result of the software mechanism is used to adjust the variable controlling the local clock frequency. This allows a hardware clock recovery mechanism to be used until the difference between the PCR and the STC exceeds a programmable threshold. A further aspect of our invention is that demultiplexors incorporating it quickly adjust the local clock so that both the frequency and absolute values are closely matched.

THE FIGURES

The invention may be understood by reference to the Figures.

DETAILED DESCRIPTION OF THE INVENTION

The MPEG-2 transport bitstream is a set of time division or packet multiplexed bitstreams. Each such time division or packet multiplexed bitstream may contain a plurality of programs, that is, television channels, digital communications, or the like. Each bitstream contains a systems stream which provides systems layer functions for one or more audio and video elementary streams in the time division or packet multiplexed single stream. The single stream is as shown in FIGS. 1 to 5, denominated "Prior Art", where many packets make up the single bitstream.

As shown generally in FIGS. 1 to 5, and with specificity in FIG. 2, the first level of granularity is a transport layer, made up of a 4 byte header, an optional adaptation field, and a payload (the payload is up to 184 bytes if the adaptation field is less than 184 bytes). In turn, at the next level of granularity, each packet is made up of a packet header, and packet payload data bytes, which may be PES packets, table sections, or private data.

Figure 6:
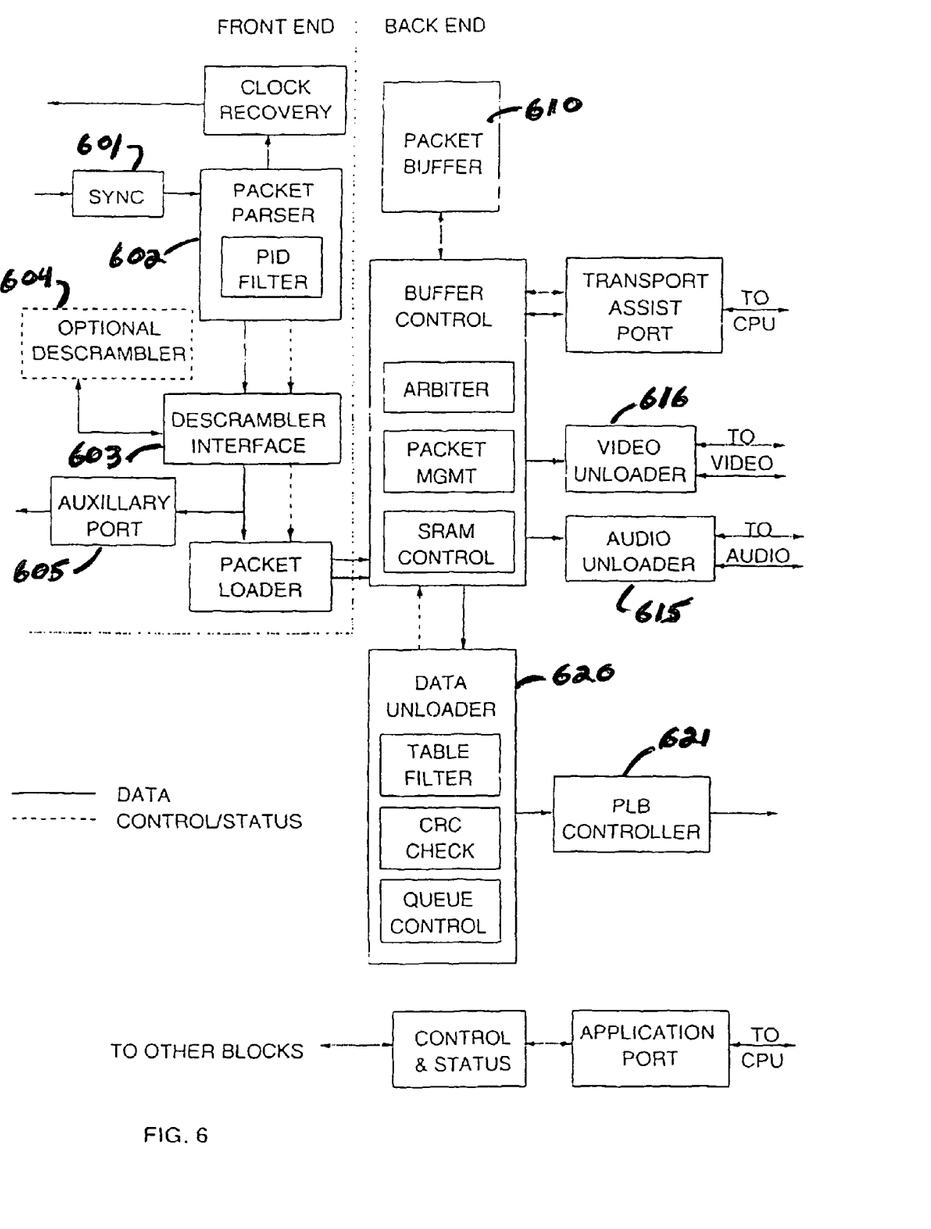
FIG. 6 shows the dataflow of the transport demultiplexor of the invention.

FIG. 6 represents the dataflow of transport stream data through the transport demultiplexor of the invention. The SYNC block 601 determines the start of the transport packet. The PACKET PARSER 602 extracts data from the transport packet header and adaptation field. The PID is one of these fields. The PID is compared to active PIDs in the PID filter. If it matches one of the predefined values, the remaining fields are extracted and the packet is forwarded to the descrambler interface 603 which will send filtered but scrambled data to a descrambler 604, if present. The descrambler, if present, descrambles and reconstructs the packets as configured by the application. The resulting stream is optionally forwarded to an auxiliary port 605 which provides means for other devices to obtain access to the data.

Concurrently, the packet parser sends PCRs from matching PCR packets to the clock recovery unit for reconstructing the System Time CLOCK (STC).

Status indicators representing parsed information are sent along with the complete transport packet to the packet loader to be stored in the packet buffer 610. The packet buffer holds a plurality, for example up to ten or more, transport packets while they are moved to the decoders and the DRAM or other memory. The packet buffer efficiently absorbs any latency of these data targets.

The transport core contains three unloaders, an audio unloader 615, a video unloader 616, and a data unloader 620. The audio unloader and the video unloader send data to the respective decoders as the data is requested. The data unloader sends data to a controller 621 for subsequent transfer to system memory. The memory unloader can also be set up to filter table sections and perform crc checking of section data.

According to the invention the transport demultiplexor accepts either parallel or serial data, detects the synchronization character in the datastream, and establishes transport packet boundaries therefrom. In the case of serial input, where only a clock bit is provided, the transport demultiplexor of the invention establishes byte alignment.

The Packet Parser extracts Transport Error Indicator information from each packet, as well as the packet boundary information, and sends it to other units to assist in their processing. Some of the parsed information is stored in the packet buffer along with the packet for use by the unloaders.

If the packet parser selects the Transport Error Indicator is set, or that the sync byte is missing and the sync drop is greater than 0, or that the TS Error Signal is active, the packet is discarded.

Transport packets containing PCRs may arrive with errors such as the Transport Error indicator in the packet header. The PCR fields from errored packets are not used for clock recovery, since the PCR field may be in error.

The value of the Payload Unit Status Indicator bit is forwarded to the unloaders through the packet buffer for use during packet unload to send the packetized elementary streams.

The Packet Parser incorporates a PID filter, such as 32 entry PID filter. The 13 bit PID value is sent to the PID filter to determine if a match occurs. Packets that match a PID filter entry are forwarded, while all other packets, including null packets, are discarded.

The transport demultiplexor of the invention further provides PID filtering. The PID filter registers and a corresponding PID enable register are used to control which packets are forwarded through the transport demultiplexor. There are up to 32 programmable PID values that are used to filter the transport stream. The PID filter associates a PID index, for example, a 5 bit PID index, with each of the 32 PID entries. One PID index is reserved for the video PID, and one for the audio PID. The other PID entries are defined by the application.

The front-end PID filtering logic filters incoming transport packets before they are placed in the packet buffer. Data from the PIDs, for example, data from up to about 32 different PIDs can be captured by the transport core or transport demultiplexor of the invention for delivery to the output ports. All other packets, including null packets, may be discarded.

A plurality of registers, for example, thirty two registers, are used to assign a PID index to each of the filtered packets to be delivered downstream, for example, to a descrambler and/or a decoder and/or a Packet Buffer. A PCR PID register holds the PCR PID value which can be the same or different from any of the general PID filter indices. If the PCR PID is not the same as one of the PID filter packets, then the PCR PID packets are not forwarded. Moreover, since the PCR PID filter is separate from the general PID filters, the STC can be initialized before the transport begins delivering data to the decoders.

When the datastream is scrambled, as would be the case for a scrambled European Telecommunications Standards Institute Digital Video Broadcasting (ETSI DVB) compliant stream, the two bit Transport Scrambling Control bits are extracted and sent to the descrambler, if present.

The two bit Adaptation Field Control Field is used to determine if an adaptation field and/or a payload is present. If an adaptation field is present, the adaptation field parsing described hereinbelow is performed. Packets with an adaptation field control value of "00" are discarded. A value of "01" indicates that there is no adaptation field, only payload. A value of "10" indicates that there is an adaptation field only, and no payload, while a value of "11" indicates that there is an adaptation field followed by payload.

The 4-bit Continuity Counter field is maintained for each enabled PID index to detect any missing data in the payload stream. The Continuity Counter is incremented on each incoming packet with a payload. This 4-bit counter wraps around to 0x0 after it reaches 0xF. The value of the continuity counter maintained by the hardware is compared to the incoming packets. If the values do not match, a PID stream error is signaled.

However, there are two situations where a PID stream error is not signaled. First, an error is not signaled if the discontinuity indicator in the adaptation field is set. In this case, the break in continuity is expected. Second, if two consecutive packets in the transport stream with the same PID have the same continuity counter value, an error is not signaled. This is because in this case one packet is a duplicate of the other. If there is no error in the first packet, the second packet is discarded. If, however, there is an error in the first packet, it is discarded and the second packet is loaded into the packet buffer.

A continuity count error is handled as a PID stream error and is forwarded to the unloaders by setting the error bit in the packet flags field stored with the packet in the packet buffer. The error can also signal an interrupt to the application processor.

The continuity field count in non-payload packets is not checked as defined by the MPEG standard. This is because the continuity count is used to insure integrity of the payload data.

The syntax of the Adaptation Field is shown in FIG. 2. Certain fields in the Adaptation Field are of special interest. For example, the Adaptation Field Length field 200 indicates the number of bytes in the adaptation field following this field. If the Adaptation Field Length Field is greater than 00, then the Adaptation Field Flags are defined. The adaptation field length is used by the unloaders to determine the start of the payload, and to deliver the Adaptation Field to the Memory queues as configured by the application processor.

The first field in the Adaptation Fields is the 1-bit Discontinuity Indicator 221. This flag indicates two different types of discontinuity, continuity counter and system time base. The discontinuity indicator in the PCR PID indicates a discontinuity in the system time base. The PCR, if present, is loaded into the STC. A system time base discontinuity is also signaled to the decoders on the first video or audio packet following the discontinuity. The application or host processor can be interrupted upon the arrival of a discontinuity indicator.

The next field in the Adaptation Fields is the 1-bit random access indicator 222. The audio and video PIDs can be configured to interrupt the host processor or assist processor upon the arrival of the random access indicator.

The PCR fields are forwarded to the Clock Recovery Unit.

The transport demultiplexor employs a local system clock that needs to be controlled to have the same frequency and phase as the encoder. As noted above, the decoder clock cannot be allowed to free run. This is because it is highly unlikely that frequency of the decoder clock would be exactly the same as the frequency of the encoder clock, and the clocks would quickly get out of synchronization.

Synchronization of the two clocks is accomplished by the Program Clock Reference (PCR) data field 230 in the Transport Stream adaptation field. The Program Clock Reference values correct the decoder clock. Program Clock Reference, or PCR, is a 42 bit field. It is coded in two parts, a PCR Base having a 33-bit value in units of 90 kHz, and a PCR extension having a 9-bit value in units of 27 MHz. 27 MHz is the system clock frequency. The value encoded in the PCR field is the byte arrival time, t(i), where i is the byte containing the last bit of the PCR base field, $$PCR\ base\ (i) = [(System\ Clock\ frequency * t(i))\ DIV\ 300]\%\ 2$$

$$PCR\ extension\ (i) = [(System\ Clock\ frequency * t(i))\ DIV\ 1]\%\ 300$$

$$PCR(i) = 300 * PCR\ base\ (i) + PCR\ extension\ (i)$$

As a general rule, the first PCR initializes the counter in a clock generation, and subsequent PCR values are compared to clock values for fine adjustment. The difference between the PCR and the local clock can be used to drive a voltage controlled oscillator, for example, to speed up or slow down the local clock.

As noted above, clock recovery and synchronization are required, especially with audio and video bitstreams. The system layer contains timing information to insure constant delay. The time stamps to accomplish synchronization are the PCR (Program clock reference) and the PTS/DTS (Presentation Time Stamp/Decoding Time Stamp).

A function of the transport demultiplexor is recovering the program clock from the transport stream. The transport demultiplexor of the invention extracts Program Clock References (PCRs) from the indicated PID, calculates the offset from the current System Time Clock (STC) value, and compares it against a threshold defined by the application to determine if clock frequency correction is required.

The clock difference can either be directly filtered, using a simple hardware algorithm, or the clock difference can provide an interrupt to allow a software algorithm to control the local clock frequency. The output of the hardware algorithm and/or the software algorithm is loaded into a register controlling the modulation of a serial pulse train which in turn is used to regulate a Voltage Controlled Oscillator, for example, an external Voltage Controlled Crystal Oscillator (VCXO) or similar device. The PWM filter register and PWM generator are shown in FIG. 7.

Figure 7:
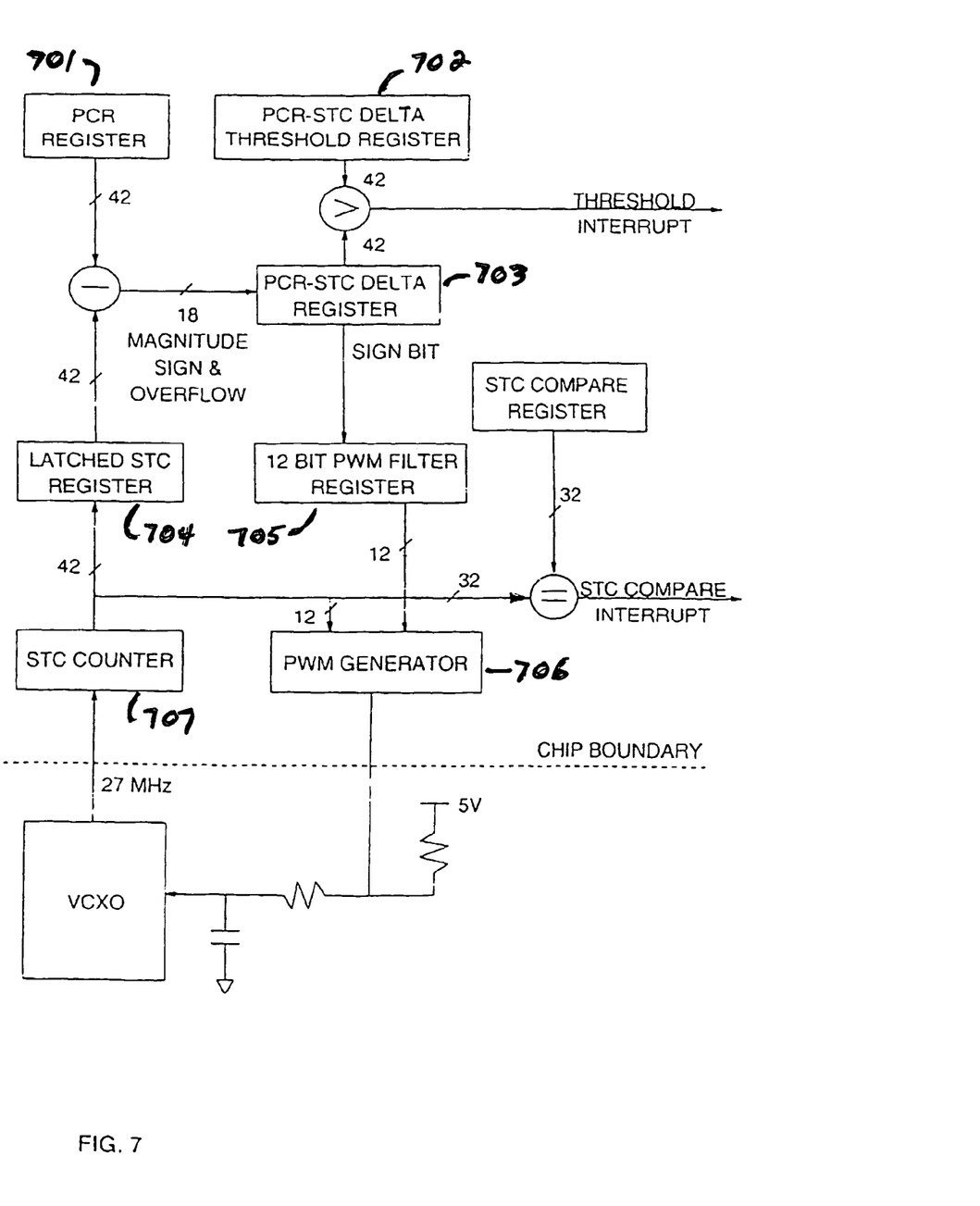
FIG. 7 shows one embodiment of the clock recovery logic which can be used by our invention.

The clock recovery logic shown in FIG. 7 provides frequency matching for the program. The clock recovery loop includes a Program Clock Recovery (PCR) register, a PCR-STC (Program Clock Recovery-System Time Clock) register 702, Delta Threshold register 703, a Latched STC (System Time Clock) register 704, a PWM (Pulse Width Modulator) register 705, PWM generator 706, and an STC (System Time Clock) counter 707.

Figure 8:
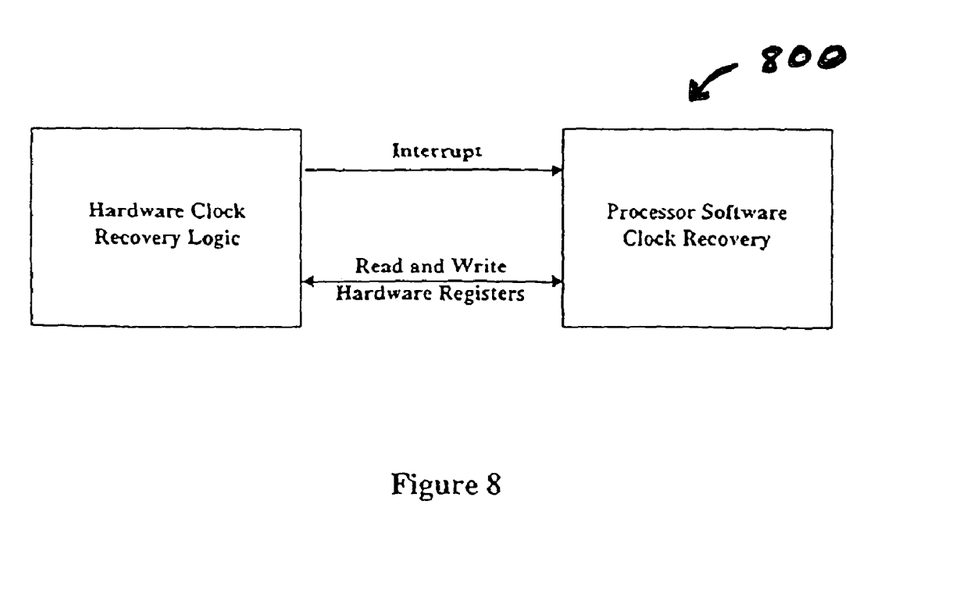
FIG. 8 shows one embodiment of the relationship between the hardware and software clock recovery mechanisms.

The clock recovery loop can be enhanced to include a software clock recovery algorithm as shown 800 in FIG. 8. The software algorithm is activated when the value in the PCR-STC Delta register exceeds the value stored in the PCR-STC Delta Threshold Register.

Figure 9:
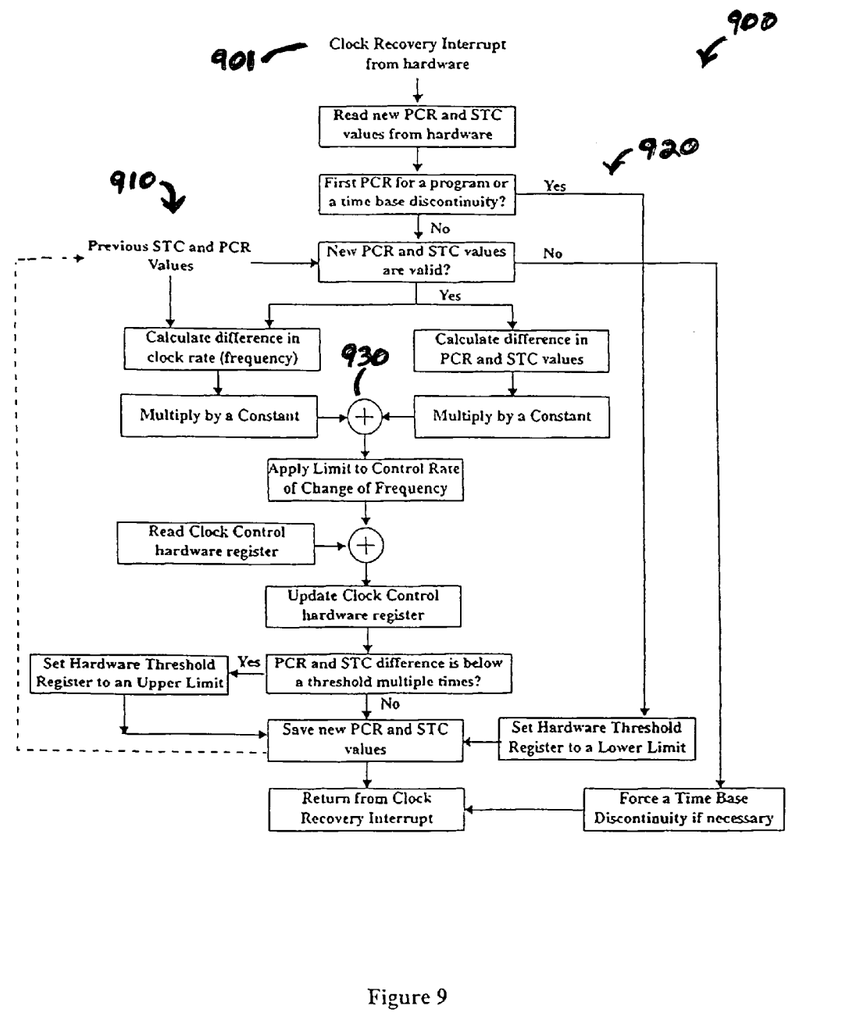
FIG. 9 shoes one embodiment of the software clock recovery mechanism of our invention.

One preferred embodiment of the software algorithm is Shown at 900 in FIG. 9. The algorithm is activated by an interrupt from hardware to indicate that a pre-determined threshold stored in the PCR-STC Delta Threshold Register has been exceeded or because the local time clock was loaded due to a program change or time base discontinuity (not shown). After the new PCR and STC values are checked for validity, two algorithms are used to calculate the amount to adjust the local clock frequency.

One algorithm 910 uses the PCR and STC values stored from when the last time the software algorithm was executed. Using both the stored previous values and the new values the exact difference in frequency between that specified by the arriving PCRs and the local clock can be determined. The result can be adjusted by multiplying by a constant to control how fast the local clock frequency can be adjusted.

The other algorithm 920 uses the current PCR and STC values to determine a difference. The difference adjusted by multiplying by a constant is also used to adjust the local clock.

The adjustments from both algorithms are summed at 930. The summed result is compared to a limit and is adjusted to the limit if it exceeded the limit. This controls maximum rate of change of the local clock frequency. The clock control register, in this case the PWM Filter register, is read and its value adjusted based on both algorithms.

Use of both algorithms shown in FIG. 9, causes the difference in frequencies between the encoder clock and local clock in the decoder to approach zero, and the difference between the PCR time stamps and the STC to also approach zero.

Once the difference between the PCR and STC falls below a threshold for several PCR arrivals, the hardware clock recovery method can be used without the aid of the software algorithms. The switch to using only the hardware algorithm is made by the software algorithm by setting in the PCR-STC Threshold register to a value larger than the software threshold check in the previous step.

While the embodiments and exemplifications of our invention have been described and illustrated with respect to one particular standard, the MPEG-2 Standard, it is, of course to be understood the methods and apparatus of our invention can be used with other time division multiplexed and packet multiplexed data streams, having packetized headers and data, including, by way of example, the European Telecommunications Standards Institute (ETSI) Digital Video Broadcasting (DVB) standard, the High Definition Television (HDTV) standard and the Direct Satellite System (DDS) standard, among others.

While the invention has been described with respect to certain preferred embodiments and exemplifications, it is not intended to limited the scope of the invention thereby, but solely by the claims appended hereto.

The invention claimed is:

1. A method of synchronizing the frequency of a local clock of a digital data decoder with the frequency of a program clock, wherein the decoder includes clock adjustment hardware for adjusting the local clock frequency and a processing unit for executing software programs and having a clock adjustment software program for adjusting the local clock frequency, the method comprising the steps of:

determining the difference between the local and program clock frequencies, then adjusting the frequency at which the local clock oscillates so that said difference approaches zero, including the steps of:
using the clock adjustment hardware to adjust the local clock frequency until a threshold condition occurs; and
after the threshold condition occurs, using the software program executing on the processing unit to adjust the local clock frequency;

wherein the adjusting the frequency at which the local clock oscillates includes switching between using said clock adjustment hardware and using said clock adjustment software program executing on the processing unit to adjust the frequency at which the local clock oscillates.

2. The method according to claim 1, wherein the local clock oscillates at the local clock frequency, the method further comprising the steps of:

maintaining a local clock value based on the oscillations of the local clock;
receiving program clock data at the decoder which specify the frequency of the program clock;
maintaining a program clock value based on the program clock data received at the decoder;
determining if there is an absolute difference between the local clock value and the program clock value;
if there is an absolute difference between the local clock value and the program clock value, then adjusting the frequency at which the local clock oscillates so that said absolute difference approaches zero.

3. The method according to claim 1, wherein:
the threshold condition is an adjustable value; and
the switching between using said clock adjustment hardware and using said clock adjustment software program includes:
setting a first value for the threshold condition;
switching from using the clock adjustment hardware to using the clock adjustment software to adjust the frequency at which the local clock oscillates when the difference between the frequencies of the local clock and the program clock is greater than said first value;
after switching from using the clock adjustment hardware to using the clock adjustment software to adjust the frequency at which the local clock oscillates, setting a second value for the threshold condition, said second value being less than said first value; and
switching from using the clock adjustment software to using the clock adjustment hardware to adjust the frequency at which the local clock oscillates when the difference between the frequencies of the local clock and the program clock falls below said second value.

4. A method of synchronizing the frequency of a local clock of a digital data decoder with the frequency of a program clock, wherein the local clock oscillates at a local clock frequency, the method comprising the steps of:

determining the difference between the local and program clock frequencies, then adjusting the frequency at which the local clock oscillates so that said difference approaches zero;
maintaining a local clock value based on the oscillations of the local clock;
receiving program clock data at the decoder which specify the program clock frequency;
maintaining a program clock value based on the program clock data received at the decoder;
determining if there is an absolute difference between the local clock value and the program clock value;
if there is an absolute difference between the local clock value and the program clock value, then adjusting the frequency at which the local clock oscillates so that said absolute difference approaches zero;
wherein the decoder includes clock adjustment hardware for adjusting the local clock frequency and a processing unit for executing software programs and having a clock adjustment software program for adjusting the local clock frequency, and wherein the step of adjusting the frequency of the local clock includes the steps of:
using the clock adjustment hardware to adjust the local clock frequency until a threshold condition occurs; and
after the threshold condition occurs, using the software program executing on the processing unit to adjust the local clock frequency;
wherein the adjusting the frequency at which the local clock oscillates includes switching between using said clock adjustment hardware and using said clock adjustment software program executing on the processing unit to adjust the frequency at which the local clock oscillates.

5. The method according to claim 4, wherein the threshold condition is a function of the difference between the local clock value and the program clock value.

6. The method according to claim 4, wherein the step of using the software program of the processor to adjust the local clock frequency includes the steps of:
monitoring for the occurrence of the threshold condition; and
transmitting a signal to the processor when the threshold condition occurs.

7. A system for adjusting a local clock on a digital data decoder, wherein the clock oscillates at a local clock frequency, the system comprising:

a system time clock register for maintaining a local clock value based on the oscillations of the local clock;
means for receiving program clock data transmitted to the decoder that specify a program clock frequency;
a program clock register for maintaining a program clock value based on the clock data transmitted to the decoder;
means for determining if there is any difference between the local clock and the program clock frequencies;
a transport demultiplexer for determining if there is an absolute difference between the local clock value and the program clock value; and
means for adjusting the frequency at which the local clock oscillates, when there is a difference between the local clock and the program clock frequencies or an absolute difference between the local clock value and the program clock value, so that said difference approaches zero;
wherein the means for adjusting the frequency at which the local clock oscillates includes:
clock adjustment hardware for adjusting the local clock frequency until a threshold condition occurs; and
a processing unit for executing software programs and configured for executing a clock adjustment software program for adjusting the local clock frequency after the threshold condition occurs;
wherein the means for adjusting the frequency at which the local clock oscillates further includes switching between using said clock adjustment hardware and using said clock adjustment software program executing on the processing unit to adjust the frequency at which the local clock oscillates.

8. The system according to claim 7, wherein the threshold condition is a function of the difference between the local clock value and the program clock value.

9. The system according to claim 7, wherein the processor is not used to adjust the local clock frequency until the threshold condition occurs.

10. The system according to claim 7, said hardware includes:
- a threshold register for monitoring for the occurrence of the threshold condition; and
- means for transmitting a signal to the processor when the threshold condition occurs.

11. A system for synchronizing the frequency of a local clock of a digital data decoder with the frequency of a program clock, comprising:
- means for determining if there is any difference between the local and program clock frequencies; and
- means for adjusting the frequency at which the local clock oscillates, when there is a difference between the local clock and the program clock frequencies, so that said difference approaches zero, wherein the means for adjusting includes:
  - i) clock adjustment hardware on the decoder for adjusting the local clock frequency until a threshold condition occurs, and
  - ii) a processing unit for executing software programs on the decoder and configured for executing a clock adjustment software program for adjusting the local clock frequency after the threshold condition occurs;
- wherein the means for adjusting the frequency at which the local clock oscillates further includes switching between using said clock adjustment hardware and using said clock adjustment software program executing on the processing unit to adjust the frequency at which the local clock oscillates.

12. The system according to claim 11, wherein the local clock has a local clock value and the program clock has a program clock value, and the threshold condition is a function of the difference between the local clock value and the program clock value.

13. The system according to claim 11, wherein said hardware includes
- a threshold register for monitoring for the occurrences of the threshold condition; and
- means for transmitting a signal to the processor when the threshold condition occurs.

* * * * *